United States Patent [19]

Ogino et al.

[11] Patent Number: 5,128,946
[45] Date of Patent: Jul. 7, 1992

[54] INFORMATION RECORDING-REPRODUCING METHOD AND APPARATUS

[75] Inventors: Tsukasa Ogino; Shigeyuki Taniwa, both of Yokohama, Japan

[73] Assignee: Canon Kabushiki Kasha, Tokyo, Japan

[21] Appl. No.: 289,016

[22] Filed: Dec. 23, 1988

[30] Foreign Application Priority Data

Dec. 28, 1987 [JP] Japan .................. 62-334991

[51] Int. Cl.⁵ .................................. G11B 20/18
[52] U.S. Cl. ...................... 371/37.4; 360/53; 369/58; 371/40.1
[58] Field of Search ............ 371/37.1, 40.1, 37.4, 371/37.5, 37.7; 369/58; 360/53

[56] References Cited

U.S. PATENT DOCUMENTS

| | | | |
|---|---|---|---|
| 3,774,154 | 11/1973 | Devore et al. | 340/146.1 F |
| 4,638,472 | 1/1987 | Ogata et al. | 369/54 |
| 4,750,178 | 6/1988 | Sako et al. | 371/37.4 |
| 4,774,700 | 9/1988 | Satoh et al. | 369/54 |
| 4,788,685 | 11/1988 | Sako et al. | 371/38 |
| 4,800,549 | 1/1989 | Yamagami et al. | 369/56 |

FOREIGN PATENT DOCUMENTS

| | | |
|---|---|---|
| 0180764 | 5/1986 | European Pat. Off. . |
| 0188627 | 7/1986 | European Pat. Off. . |
| 0198702 | 10/1986 | European Pat. Off. . |
| 2580850 | 10/1986 | France . |
| 8501382 | 3/1985 | PCT Int'l Appl. . |
| 2175123 | 11/1986 | United Kingdom . |

OTHER PUBLICATIONS

De Haan, et al., "A System Concept for Optical Data Recording", International Conference on Video and Data Recording, IERE, Jul. 1979, p. 1 through 9.

Tanaka et al., "Application of Generalized Product Code for Stationary-Head Type Professional Digital Audio Recorder", 2334 Transactions of the IECE of Japan, vol. E69, No. 6, Jun. 1986, p. 1 through 10.

Perera, et al., "Storage Technology Corporation Optical Storage Error Control", Topical Meeting on Optical Data Storage, Apr. 1984, p. 1 through 4.

Primary Examiner—Stephen M. Baker
Attorney, Agent, or Firm—Fitzpatrick, Cella, Harper & Scinto

[57] ABSTRACT

An information recording-reproducing method is disclosed. An error correction code of M bytes and N bytes is imparted in a vertical direction and a horizontal direction, respectively, to data of m×n bytes. A signal of (m+M)×(n+N) bytes (m, n, M and N being one or an integer greater than one) is produced. The signal to which the error correction code has been imparted is written-in to a recording medium. The written-in signal is read out from the recording medium. Error correction on the read-out signal is effected in only one of the vertical direction and the horizontal direction by the use of the error correction code included in the signal. A determination is made of the occurrence of abnormality in the writing-in when all the errors in the signal cannot be corrected by the error correction in the one direction. The signal for which has been determined that no abnormality exists in the writing-in is re-read out from the recording medium and error correction on the re-read-out signal in the vertical direction and the horizontal direction is effected by the use of the error correction code included in the signal. Data is thereby reproduced.

4 Claims, 14 Drawing Sheets

FIG. 9
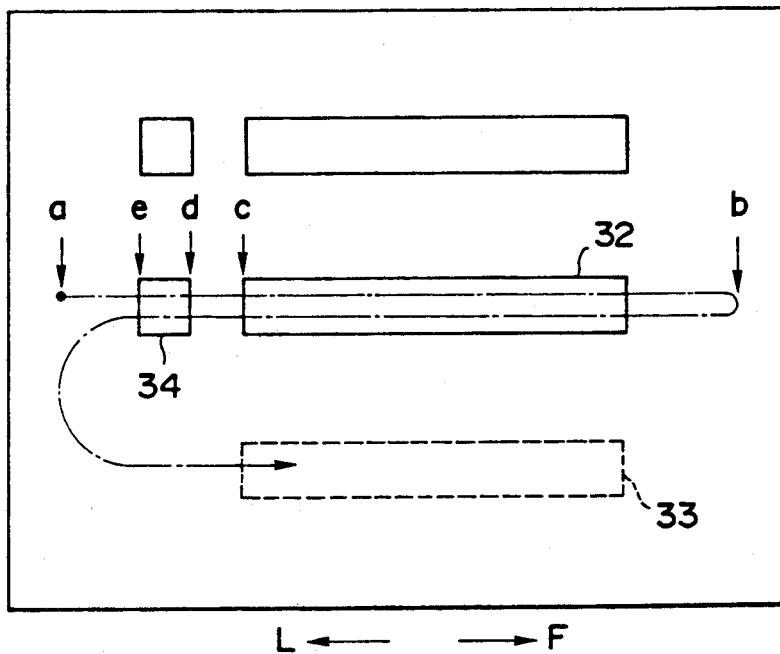
FIG. 10A
FIG. 10B
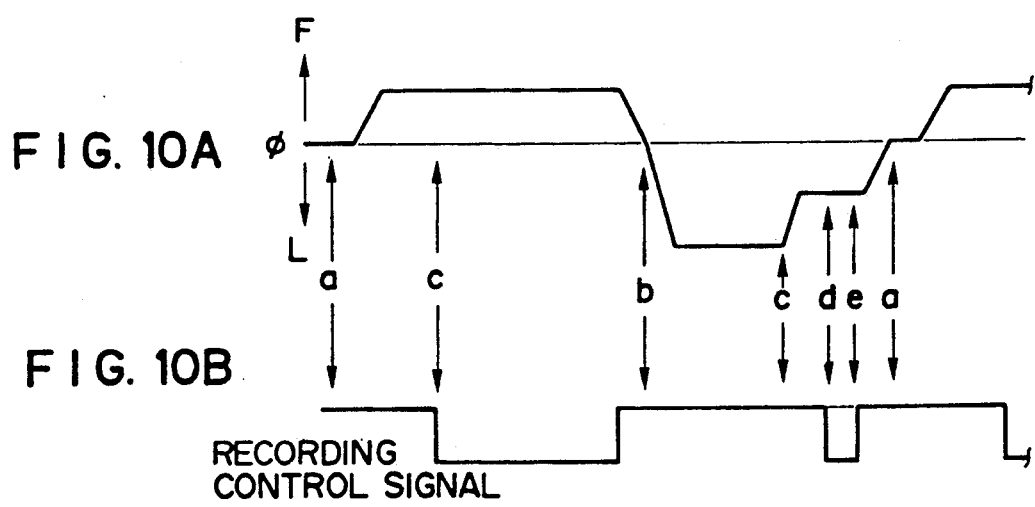
RECORDING CONTROL SIGNAL

F I G. 14
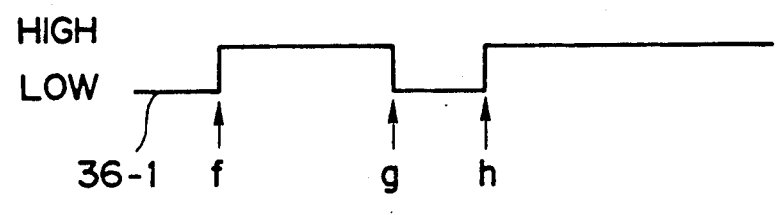
F I G. 15
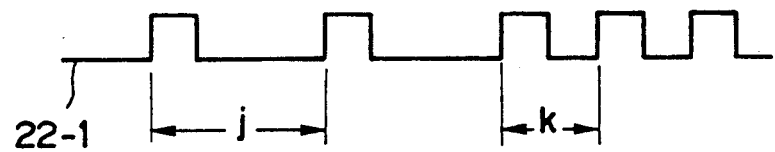

INFORMATION RECORDING-REPRODUCING METHOD AND APPARATUS

BACKGROUND OF THE INVENTION

1. Field of the Invention

This invention relates to an information recording-reproducing method and apparatus, and in particular, to an information recording-reproducing method and apparatus in which error correction is effected.

2. Related Background Art

Various information recording mediums such as disk-like mediums, card-like mediums and tape-like mediums are known as information recording mediums on which information is recorded by the use of light and from which recorded information is read out. Among these, an optical information recording medium formed in the shape of a card (hereinafter referred to as the optical card) is expected to have a great demand as a compact, light-weight information recording medium of great capacity that is convenient to carry.

FIG. 1 of the accompanying drawings is a schematic plan view of such an optic card, and FIG. 2 of the accompanying drawings is a fragmentary enlarged view thereof.

In FIG. 1, reference numeral 1 designates the optical card, reference numeral 2 denotes information tracks, and reference numeral 3 designates the home position. The optical card 1 is such that by scanning a light beam modulated in accordance with recording information and reduced to a minute spot on the optical card, information is recorded as optically detectable record bit rows (information tracks). To accurately record and reproduce the information at this time, without causing trouble such as crossing of the information tracks 2, it is necessary to control the applied position of the light beam in a direction perpendicular to the scanning direction (auto-tracking, hereinafter referred to as AT). Also, to stably apply the minute spot in spite of any bending or mechanical error of the optical card, it is necessary to control the light spot in a direction perpendicular to the optical card (auto-focusing, hereinafter referred to as AF). As shown in FIG. 2, tracking tracks $5 (5_1, 5_2, \ldots)$ for effecting AT are provided between the information tracks $2 (2_1, 2_2, \ldots)$ of the optical card 1.

A method of recording information on and reproducing information from the optical card will now be described.

In FIG. 1, the light beam exists at the home position 3 at first. The light beam then moves in the direction of arrow D, seeks an information track 2N to be recorded or reproduced, and scans the information track 2N in the direction of arrow F, thereby accomplishing recording or reproducing of the information.

Also, when the optical information recording medium is a nonerasable postscript type recording medium, the recorded data is immediately reproduced and whether it is the same as the record data is examined (hereinafter referred to as verify), and if the result is wrong, a recording method of recording the data again on the next information track is performed.

As means for examining whether the data recorded on the recording medium is the same as the record data, i.e., verifying means, there is adopted a method of comparing the record data with the immediately reproduced data of the recorded data and examining any error in the data, or a method of comparing the parity of the record data with the parity of the reproduced data to thereby examine any error in the data.

However, in such methods, when the information recording medium is reproduced after verification of the record, there is a possibility that error occurs due to dust, a flaw or the like. Usually, such a recording-reproducing apparatus has a correcting ability to add an error correction code (ECC) to the data to be recorded and to correct the error resulting from such dust, flaw or the like on the information recording medium during recording and reproduction. However, in the above-described methods, the error correcting ability during verification is the same as the error correcting ability during reproduction. This has led to a problem that there occurs a case wherein correction is impossible during reproduction with regard to an error due to an error cause (dust, a flaw or the like) newly arising after recording and verification.

So, U.S. Pat. No. 3,774,154 proposes an apparatus in which the error correcting ability is reduced more during verification than during reproduction, whereby even an error arising after verification can be corrected. This apparatus has two error correcting means, i.e. ECC and a signal error pointer. The apparatus is designed to display a recording error when an error exceeding the ability of the ECC is detected during verification. Also, in column 5, lines 48 through 64 of the above-noted U.S. Patent, it is disclosed that the criteria of light check are reduced during verification.

However, the above-described apparatus is complicated in construction, because it has means for generating a signal error pointer, in addition to ECC.

SUMMARY OF THE INVENTION

It is the object of the present invention to solve the above-noted problems peculiar to the prior art and to provide an information recording and reproducing method and apparatus which can accomplish highly reliable recording and reproduction of data by a simple technique.

The above object of the present invention is achieved by an information recording-reproducing method comprising the step of imparting an error correction code of M bytes and N bytes in a vertical direction and a horizontal direction, respectively, to data of $m \times n$ bytes, and producing a signal of $(m+M) \times (n+N)$ bytes (m, n, M and N being 1, or a greater integer), the step of writing into a recording medium the signal to which the error correction code has been imparted, the step of reading out the written-in signal from said recording medium, the step of effecting error correction on the read-out signal in only one of the vertical direction and the horizontal direction by the use of the error correction code included in the signal, the step of judging that there has been an abnormality in the writing-in when all the errors in the signal cannot be corrected by the error correction in the one direction, the step of re-reading out from the recording medium the signal for which it has not been judged that there has been an abnormality in the writing-in, and the step of effecting error correction on the re-read-out signal in the vertical direction and the horizontal direction by the use of the error correction code included in the signal and reproducing the data, and an apparatus for carrying out this method.

BRIEF DESCRIPTION OF THE DRAWINGS

FIG. 9 illustrates the operation during recording on the optical card by the information recording-reproducing apparatus of the present invention.

FIG. 10A illustrates the locus of a light beam spot during recording, and FIG. 10B illustrates the recording timing.

FIG. 14 illustrates the optical card feeding operation.

FIG. 15 illustrates the operation of detecting a reference track.

DESCRIPTION OF THE PREFERRED EMBODIMENT

Figure 1:
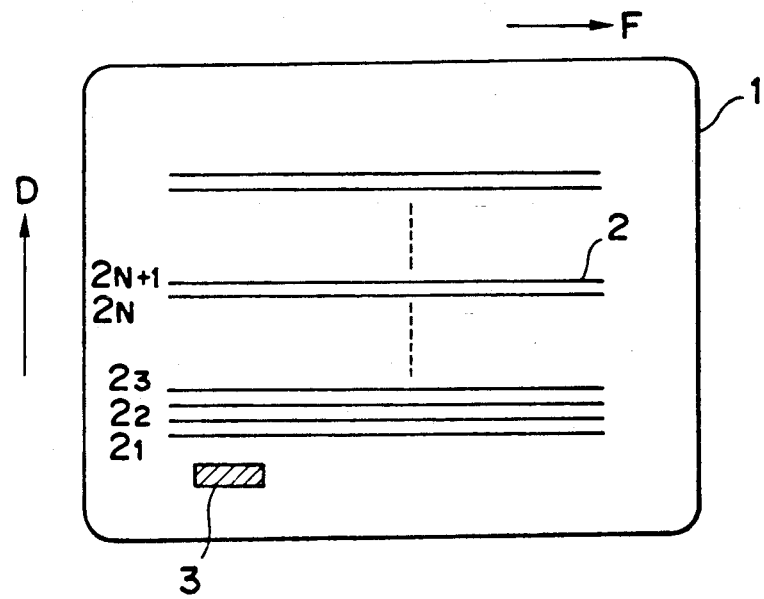
FIG. 1 is a schematic plan view of an optical card according to the prior art.
Figure 2:
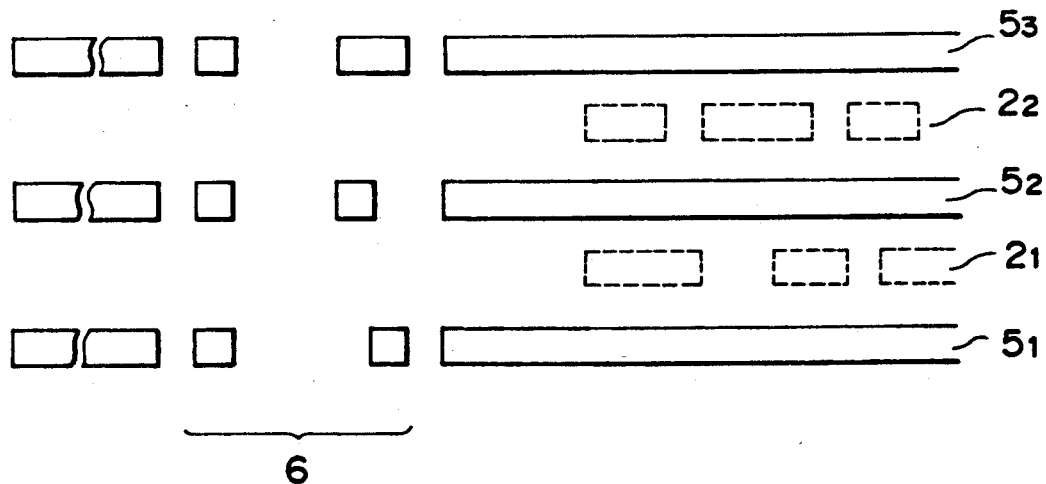
FIG. 2 is a fragmentary enlarged view of the optical card shown in FIG. 1.

An embodiment of the present invention will hereinafter be described in detail with reference to the drawings.

The basic construction of an optical card and the construction of an optical head portion will first be described. These constructions are described in detail, for example, in U.S. application Ser. No. 07/098,066 filed on Sep. 17, 1987, now U.S. Pat. No. 4,872,154. In the ensuing description, like members are given like reference numerals.

FIG. 1 is a schematic plan view of an example of an optical card for use with the present invention.

Figure 4:
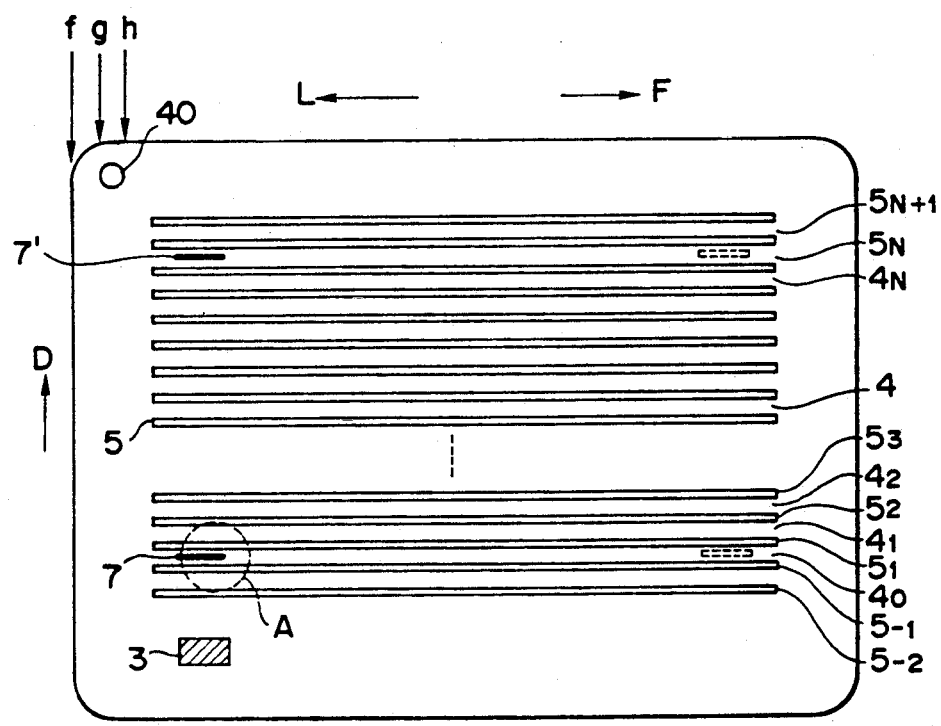
FIG. 4 is a schematic plan view of an example of the optical card used in the present invention.
Figure 5:
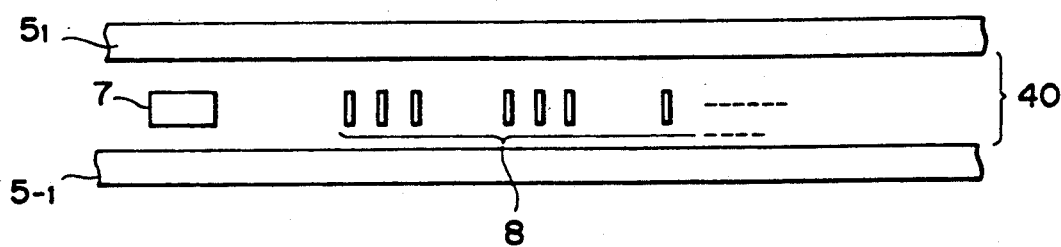
FIG. 5 is a fragmentary enlarged view of the portion A of FIG. 4.

FIG. 5 is a fragmentary enlarged view of the portion A of FIG. 4.

In these figures, tracking tracks 5 ($5_1$, $5_2$, ...) preformed in the shape of continuous lines are disposed at equal intervals on the optical card 1. Data recording sections 4 ($4_1$, $4_2$, ...) for recording information are provided between the tracking tracks. That is, the optical card 1 has data recording sections between all the tracking tracks.

As shown in FIG. 5, a G-mark 7 is provided between the tracking tracks $5_1$ and $5_{-1}$. This G-mark 7 is a mark for discriminating a reference track, and is disposed at a predetermined location on the optical card by a preformat. A pattern 8 for discriminating the kind of medium, which is an auxiliary data portion, is recorded and formed by a preformat or a light spot on the extension of a data recording portion 40 on which the G-mark 7 lies. This pattern 8 for discriminating the kind of medium represents the kind of optical card, and comprises recorded information such as the modemodulating system, the data capacity per track and the total number of tracks.

Figure 6:
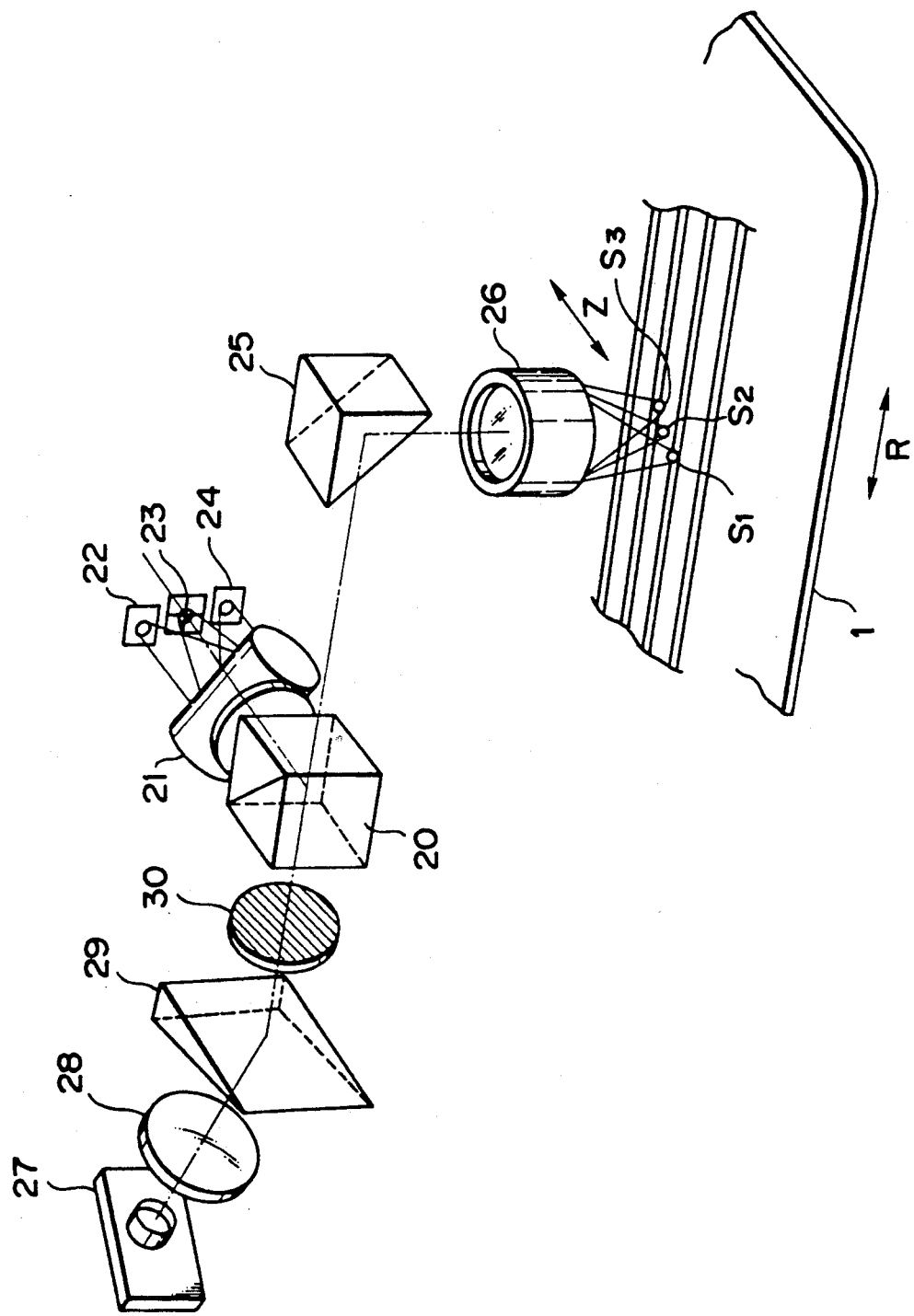
FIG. 6 is an illustration regarding the construction of the optical head portion of the information recording-reproducing apparatus.

FIG. 6 is an illustration regarding the construction of the optical head portion of an information recording-reproducing apparatus.

Figure 7:
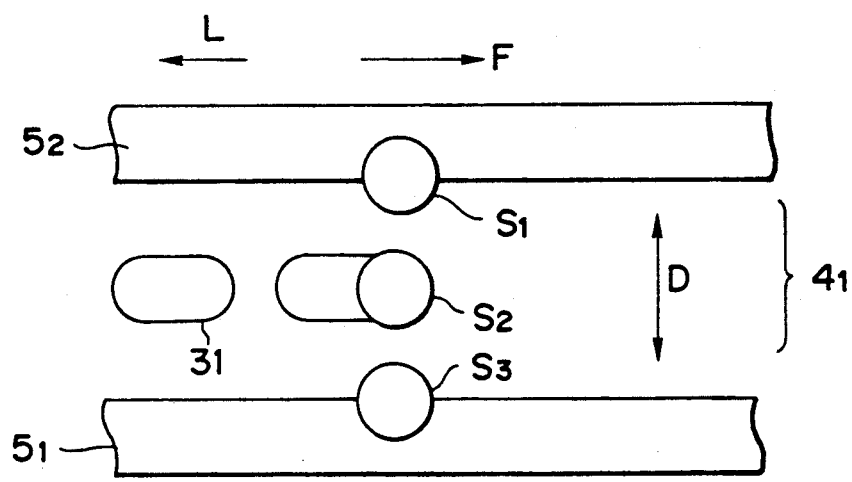
FIG. 7 illustrates a light beam applied onto the optical card.

FIG. 7 illustrates a light beam applied onto the optical card.

Figure 8:
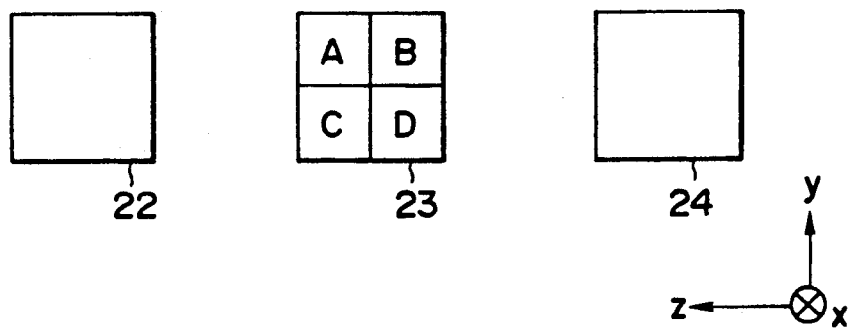
FIG. 8 illustrates the construction of a photodetector.

FIG. 8 illustrates the construction of a photodetector.

A light beam emitted from a light source 27 such as a semiconductor laser is collimated by a collimator lens 28 and divided into three beams by a diffraction grating 30. These light beams are imaged on the tracking tracks $5_1$ and $5_2$ and the data recording portion 41 on the optical card 1 by an objective lens 26, as shown in FIG. 7, and form beam spots $S_1$, $S_2$ and $S_3$. Here, the optical card 1 is moved in the direction of arrow R by driving means, not shown, and is scanned in the direction in which the tracking tracks extend, by the beam spots. The reflected light of the beam spots $S_1$, $S_2$ and $S_3$ again pass through the objective lens 26, are reflected by a beam splitter 20 and are projected onto photodetectors 22, 23 and 24 by a condensing lens system 21. The condensing lens system 21 is an astigmatic system, and is an example disposed so that auto-focusing can be effected by a well-known astigmatic system. The photodetectors comprise an arrangement as shown in FIG. 8, and the photodetector 23 is divided into four areas A, B, C and D. In FIG. 6, reference numeral 29 designates a prism for converting the cross-sectional distribution of the light beam emitted from the semiconductor laser and collimated from an ellipse into a circular shape, and reference numeral 25 denotes a mirror for directing the light beam to the objective lens 26.

The operation of recording information on the optical card by the use of the aforedescribed apparatus will now be described with reference to FIG. 7.

First, when information is to be recorded on the data recording section $4_1$, the beam spots $S_1$, $S_2$ and $S_3$ are applied to the tracking track $5_2$, the data recording section $4_1$ and the tracking track $5_1$, respectively. These beam spots are caused to scan in the direction of arrow F by the movement of the optical card 1 as previously described. The reflected light from the beam spot $S_1$ enters the aforementioned photodetector 22, and the reflected light from the beam spot $S_3$ enters the photodetector 24, and a tracking signal is detected by the so-called three-beam method. That is, if the beam spots $S_1$ and $S_3$ deviate relative to the tracking tracks $5_2$ and $5_1$, a difference occurs between the intensities of the light beams entering the photodetectors 22 and 24, and by comparing the signals from these light receiving surfaces, there is obtained a tracking signal. On the basis of this tracking signal, the beam spots $S_1$, $S_2$ and $S_3$ are moved as a unit in a direction perpendicular to the scanning direction (the direction of arrow D in FIG. 4) by unshown tracking means (such as means for moving the objective lens 26 in the direction of arrow Z in FIG. 6), whereby AT is accomplished. On the data recording section $4_1$, record pits 31 are accurately recorded along the tracking tracks $5_1$ and $5_2$ by the beam spot $S_2$.

The information recording-reproducing apparatus of the present invention will now be described.

The information recording-reproducing apparatus of the present invention records a special mark indicative of the presence or absence of an error, after verification, on the extension of the information track.

Regarding the special mark indicative of the presence or absence of error, there is a case wherein a mark (hereinafter referred to as the E-mark) is recorded when there is error, a case wherein a mark (hereinafter referred to as the V-mark) is recorded when there is no error, or a case wherein the E-mark and the V-mark are selected and recorded depending on the presence or absence of error.

A method of recording the E-mark will hereinafter be described as an example of the recording of the mark.

FIG. 9 illustrates the operation during recording on the optical card by the information recording-reproducing apparatus of the present invention.

FIG. 10A illustrates the locus of the light beam spot during recording, and in this figure, the vertical axis represents speed, and directions F and L correspond to directions F and L in FIG. 9.

FIG. 10B illustrates the recording timing, and in this figure, HIGH indicates the non-recording portion and LOW indicates the recording portion.

Figure 11:
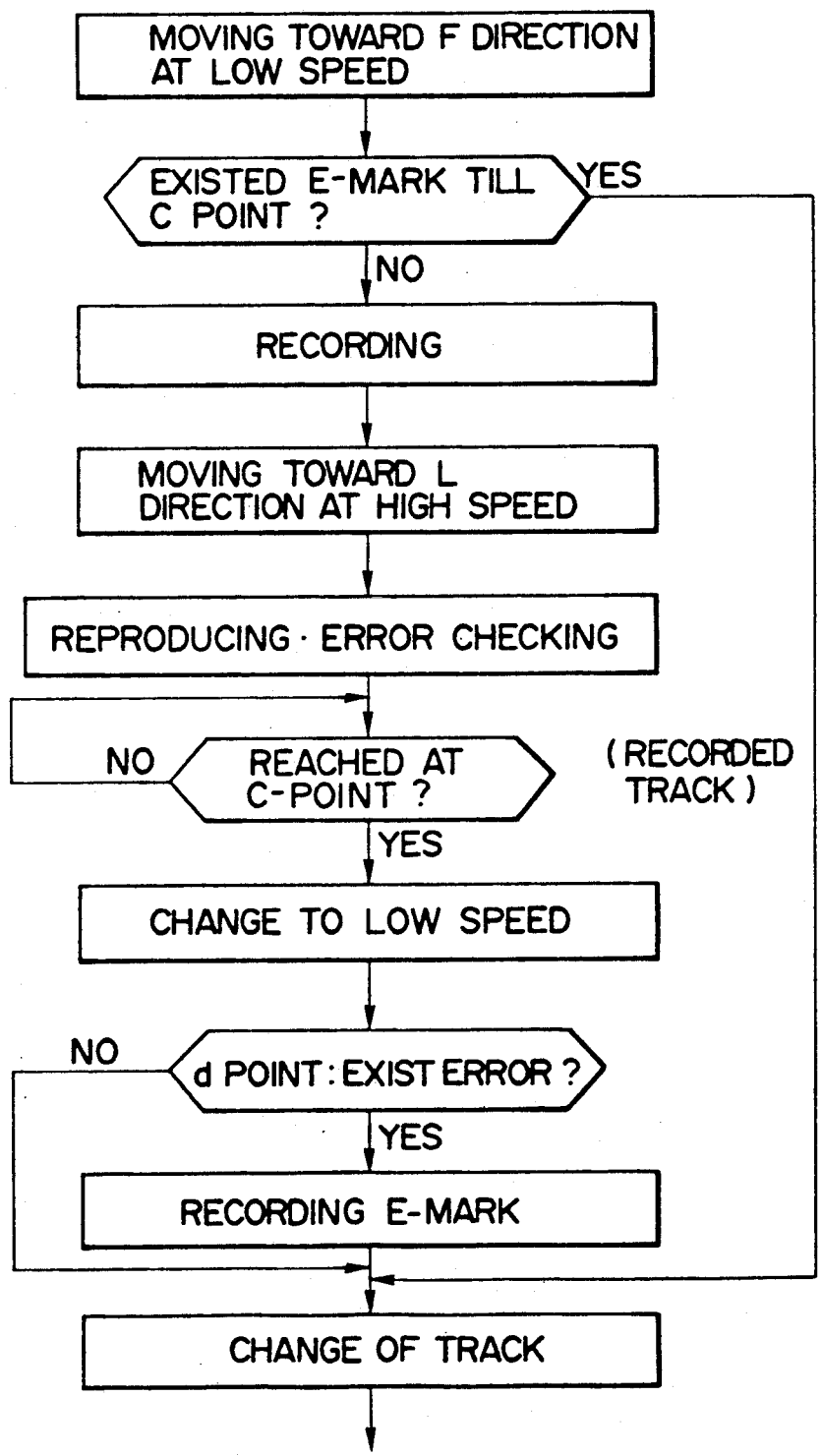
FIG. 11 is a flowchart illustrating the operation during recording when an E-mark is used.

FIG. 11 is flowchart illustrating the operation during recording, and in this figure, "F direction" is indicative of the travel direction of the light spot.

The recording operation will hereinafter be described with reference to FIGS. 9, 10A and 10B and in accordance with the flowchart of FIG. 11.

When as shown in FIGS. 9 and 10, the light spot is at a point a, the light spot is moved in the F direction at a low speed and if the signal by the E-mark does not appear until the light spot reaches a point c (this is detected by a position detector, not shown, or by measurement of time), recording is started, and after recording is completed, the speed is changed to a high speed and the direction is changed to L (a point b). When the signal by the E-mark is detected, shift is made to the next information track and a similar operation is performed.

Figure 16A:
FIGS. 16A–16C are schematic views for illustrating the E-mark.

When the light spot is moving in the L direction, reproduction of the data and check-up of the error are effected, and when the light spot reaches the point c, that is, after all data are reproduced, the speed is changed to a low speed without the direction being changed. When the light spot reaches a point d, if there is an error, a predetermined pattern, i.e., the E-mark, is recorded on the recording area 34 for a predetermined period of time. If there is no error, the recording control signal of FIG. 10B is inhibited (dotted line), whereby recording of the E-mark is inhibited. Irrespective of the presence or absence of an error, after the light spot has passed a point e, the light spot is moved from the data recording area 32 to the data recording area 33, and a similar operation is repeated. As described above, according to the present invention, recording of data, verification and recording of the E-mark are completed by one reciprocal movement of the light spot on the same information track and therefore, the recording time can be shortened. In the foregoing description, the speed during recording and the speed during reproduction are made different as shown in FIG. 10B, but the effect will not change even if the two speeds are the same. The E-mark, as shown in FIG. 16A, may basically be a bar-like pattern.

Figure 16B:
Figure 16C:
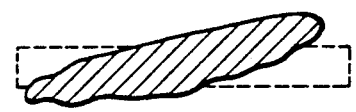

However, if there is dust or a flaw in the unrecorded portion and moreover, in the portion wherein the E-mark is disposed (see FIG. 16C), there is the undesirable possibility that such dust or flaw is regarded as the E-mark and even a good track is recognized as a bad track. In order to eliminate such a disadvantage, the E-mark may be recorded in a pattern on a dotted line as shown in FIG. 16B, whereby it can be distinguished from the signal shown by FIG. 16C.

Figure 17:
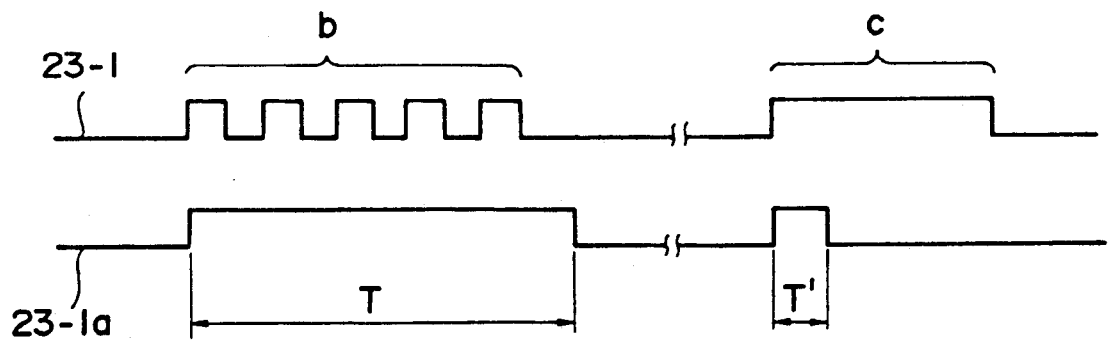
FIG. 17 is a wave form diagram for illustrating the operation of detecting the E-mark.

This will be described with reference to FIG. 17. As shown in FIG. 17, when the E-mark is detected by the photodetector 23, the E-mark portion is a portion b in the output signal 23-1 of the photodetector and the portion caused by dust, a flaw or the like is a portion c. When the output signal 23-1 is input to a signal processing circuit, not shown, for example, a retriggerable monostable multivibrator, an output signal 23-1a as shown in FIG. 17. Since the E-mark is a pattern on a dotted line, the pulse width T by the signal of the area b becomes greater than the pulse width T' by the signal of the area c, and if the pulse width T is greater than a predetermined value, it may be regarded as the E-mark, whereby distinction between the E-mark (FIG. 16B) and dust or a flaw (FIG. 16C) becomes possible.

The pattern shape of the V-mark and the method of detecting it are also similar to what has been described above with respect to the E-mark.

The case wherein there is not an E-mark during recording includes a case wherein there is no error, but information is being recorded and a case where information is not yet recorded, and it is difficult to prevent oversight completely, but if recording is effected with the E-mark and the V-mark selected in accordance with the presence or absence of error, it is possible to distinguish between the absence of error, the presence of error and non-recording.

During reproduction, processing somewhat differs between a case wherein the light spot is at the point a at the start of reproduction and a case wherein the light spot is at the point b at the start of reproduction. When the light spot is at the point a, if the signal by the E-mark can be detected before the light spot reaches the point c, the reproducing process for data is not carried out, but track change is effected at the point b and reproduction of the next information track is executed. On the other hand, when the light spot is at the point b, up to error check is executed, and if the E-mark can be detected, track change is effected irrespective of the presence or absence of an error and reproduction of the next information track is executed. When there is an error in spite of the E-mark having not been detected, re-try is repeated a predetermined number of times.

Thus, wherein a plurality of information tracks are to be continuously reproduced, even if there is an information track having the E-mark (hereinafter referred to as a bad track), that bad track need not execute re-try and therefore, even if there is a number of bad tracks, the time required for reproduction does not become as long as compared to a case wherein there is no bad track.

A similar effect can be obtained by using the V-mark instead of the E-mark.

Figure 12:
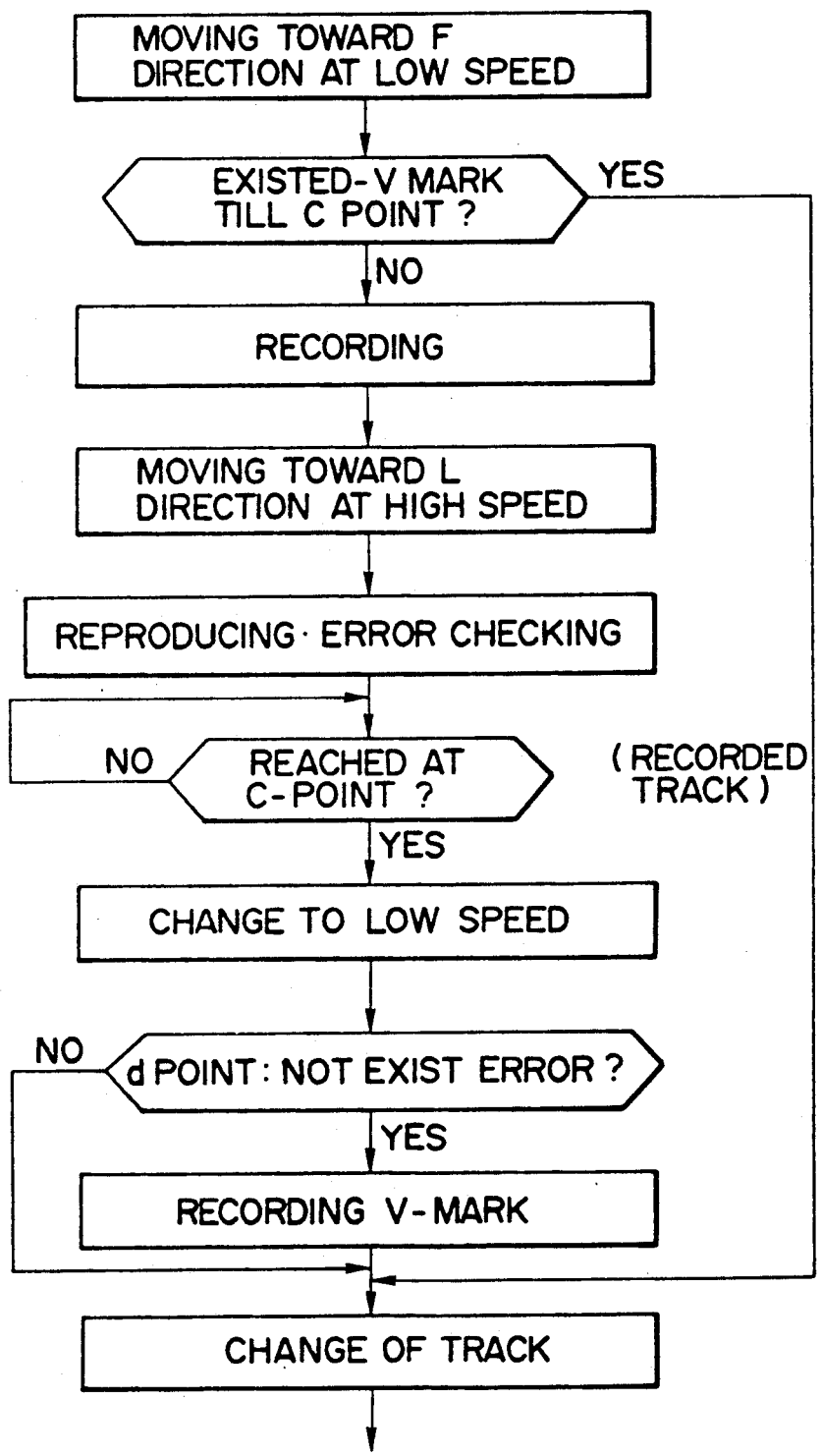
FIG. 12 is a flowchart illustrating the operation during recording when a V-mark is used.

FIG. 12 is a flowchart illustrating the operation during recording in a case wherein the V-mark is used.

In the same manner as in the case wherein the E-mark is used, when the light spot is at the point a as shown in FIGS. 9, 10A and 10B, the light spot is moved at a low speed in the F direction, and if the signal by the V-mark does not appear before the light spot reaches the point c (this is detected by a position detector, not shown, or measurement of time), recording is started, and after the recording is completed, the speed is changed to a high speed and the direction is changed to L (the point b). If the signal by the V-mark is detected, shift is made to the next information track and a similar operation is performed.

When the light spot is moving in the L direction, reproduction of data and check-up of error are effected, and when the light spot reaches the point c, that is, after all data are reproduced, the speed is changed to a low speed without the direction being changed, and if there is no error when the light spot reaches the point d, a predetermined pattern, i.e., the V-mark, is recorded on the recording area 34 for a predetermined period of time. If there is an error, the recording control signal of FIG. 10B is inhibited (dotted line) to thereby inhibit the recording of the V-mark. Irrespective of the presence or absence of an error, after the light spot has passed the point e, the light spot is moved from the data recording portion 32 to the data recording portion 33 and a similar operation is repeated.

As described above, in the same manner as in the case of the E-mark, recording of data, verification and recording of the V-mark are completed by one reciprocal movement on the same information track and therefore, the recording time can be shortened. In the foregoing description, the speed during recording and the speed during reproduction are made different as shown in FIG. 10B, but the effect will not change even if the two speeds are the same.

During reproduction, processing somewhat differs between the case wherein the light spot is at the point a at the start of reproduction and the case wherein the light spot is at the point b at the start of reproduction. When the light spot is at the point a, if the signal by the V-mark cannot be detected before the light spot reaches the point c, the reproducing process for data is not effected, but track change is effected at a point B and reproduction of the next information track is executed. On the other hand, when the light spot is at the point b, up to error check-up is executed and, if the V-mark cannot be detected, track change is effected irrespective of the presence or absence of an error and reproduction of the next information track is executed. If there is an error in spite of the V-mark having been detected, retry is repeated a predetermined number of times.

Thus, wherein a plurality of information tracks are to be continuously reproduced in the same manner as in the case of the E-mark, even if there is an information track having no V-mark (hereinafter referred to as a bad track), that bad track need not execute re-try and therefore, even if there is a number of bad tracks, the time required for reproduction does not become as long as compared to a case wherein there is no bad track.

Description will now be made of the error check-up method carried out to record the aforementioned E-mark by the use of the information recording-reproducing apparatus of the present invention.

In the present embodiment, the Reed-Solomon method will be described as an example of the error correcting method.

Figure 18:
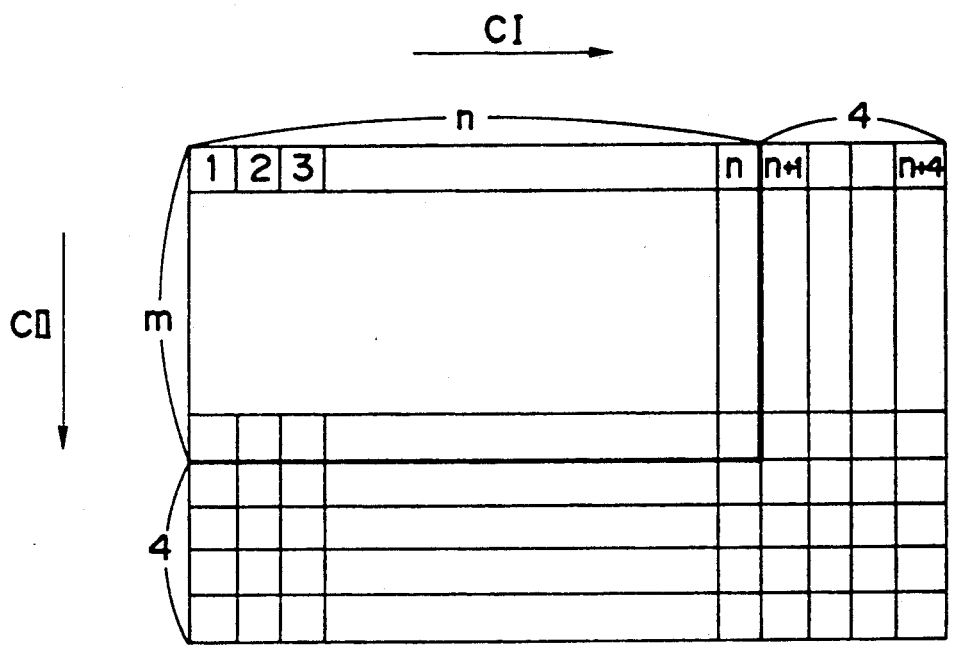
FIG. 18 illustrates the Reed-Solomon method.
Figure 19:
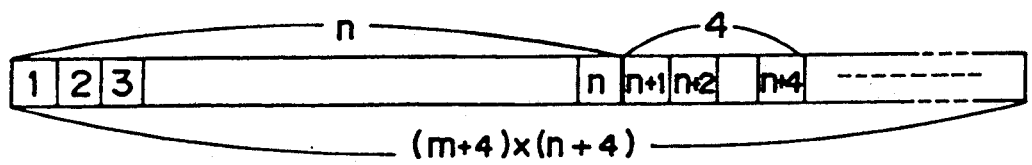
FIG. 19 illustrates the disposition of an error correction data code.

FIG. 18 is an illustration representing a method of adding an error correcting data code to data (m × n) bytes by the Reed-Solomon method. FIG. 19 is a view showing the arrangement of data of (m × n) bytes and the added error correcting data code in the order of recording.

When data (m × n) bytes are to be recorded on the optical card, an error correcting data code of four bytes is found relative to data m bytes in the vertical direction CII and an error correcting data code of also four bytes is found relative to data n bytes in the horizontal direction CI, whereby data of a total of (m + 4) × (n + 4) bytes are produced (hereinafter referred to as encode). When the recorded data are to be reproduced from the optical card, data of (m + 4) × (n + 4) bytes are read and data is found for each n bytes while error correction is effected in the direction CI, and this operation is repeated with respect to 1 column through m columns. Also in the direction CII, error correction is effected up to 1 rows through n rows and data is found for each m bytes. (This will hereinafter be referred to as decode.) Here, in the encode, error correcting data codes are successively found in the direction CII, whereafter error correcting data codes are found with respect to the direction CI, and in the decode, error correction is effected in the direction CI, whereafter error correction is effected in the direction CII. The system in which error correction is thus effected with respect to the direction CI and CII or the directions CII and CI is referred to as the interleave system. Such a system is described in detail, for example, in U.S. Pat. No. 4,413,340, U.S. Pat. No. 4,476,562 and U.S. Pat. No. 4,546,474.

Description will now be made of the error check-up method carried out during verification. Error check-up is effected by the use of the aforedescribed error correcting method.

The error check-up during verification is such that error correction only in the direction CI is effected in the aforedescribed decode and when correction cannot be made, it is regarded as verification error.

In the present embodiment, when in (n + 4) bytes in the direction CI, an error of three bytes occurs even in one of 1 through m columns, it is regarded as a verification error and data of (m + 4) × (n + 4) bytes are again written into another track.

The degree of certainty of the recorded data after recording and verification is determined to be an error less than three bytes in (n + 4) bytes in the direction CI, in the matrix by the Reed-Solomon method.

During reproduction of the recorded data of (m + 4) × (n + 4) bytes, the aforedescribed decode is effected, that is, in addition to the correction during verification effected after recording, correction is also effected for the direction CII (the interleave system). Therefore, there is ability to correct the error of the reproduced data resulting from a flaw created after recording and verification or dust during reproduction.

In the present embodiment, when error correction is effected during decode by the use of the interleave system, that error correction is carried out only in the direction CI during verification, whereby the degree of certainty of the data during recording is enhanced and the error correcting ability during reproduction has a superfluity, and the reliability of recording and reproduction of data in the present apparatus is improved.

The construction of the information recording-reproducing apparatus of the present invention will now be described.

Figure 3:
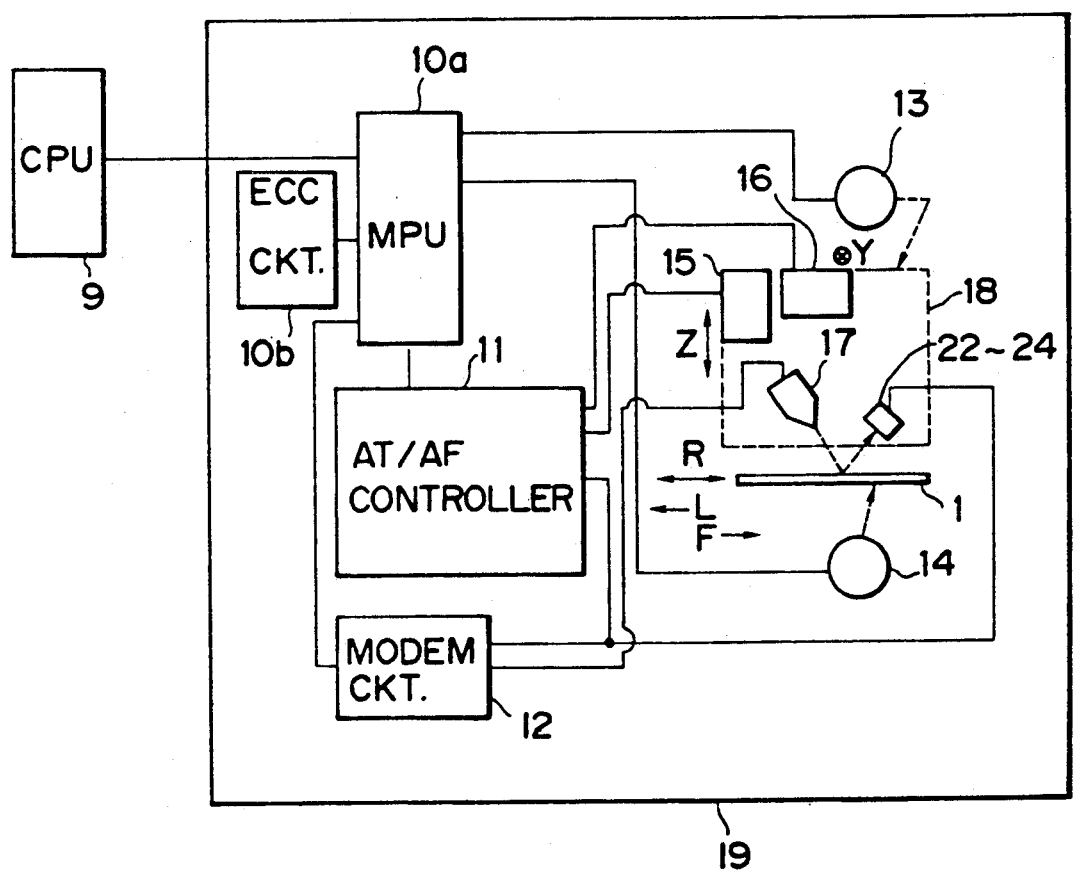
FIG. 3 is a schematic view of an embodiment of the information recording-reproducing apparatus of the present invention.

FIG. 3 is a schematic diagram of an embodiment of the information recording-reproducing apparatus of the present invention.

The information recording-reproducing apparatus (hereinafter referred to as the drive) 19 is connected to a high-rank control device (hereinafter referred to as the CPU) 9, and communications, control, etc. of data are effected between the drive 19 and the CPU 9. A microprocessing unit (MPU) 10a in the drive 19 contains an ROM and an RAM therein, and chiefly controls a card feeding motor 14 and a head feeding motor 13 and an AT/AF control circuit 11 receives the signal of photodetectors 22, 23 and 24 and drives an AF actuator 15 and an AT actuator 16. A modemodulating circuit 12 varies the intensity of light emitted from an irradiating optical system 17 during recording to thereby execute recording, and demodulates data on the basis of the signal of the photodetector 23 during reproduction. However, when the card is inserted, the medium kind discriminating pattern 8 of the reference track shown in FIG. 5 is demodulated and discriminated by the MPU 10a.

An EEC circuit 10b is controlled by the MPU 10a, and encodes data to be supplied to the modemodulating circuit 12 and decodes the demodulated signal from the modemodulating circuit 12.

The recording-reproducing operation of the above-described recording-reproducing apparatus will now be described with reference to FIGS. 3, 4, 13A, 13B, 14 and 15.

Figure 13A:
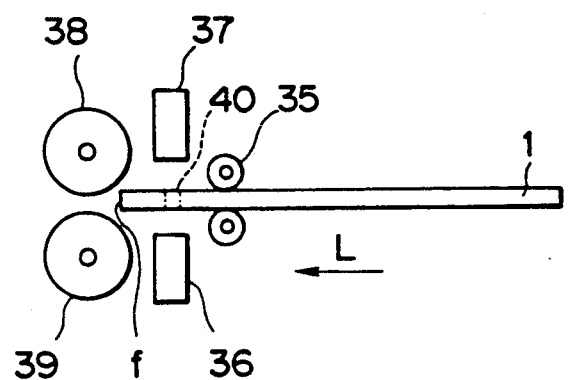
FIGS. 13A and 13B are schematic plan views of an optical card feeding device.
Figure 13B:
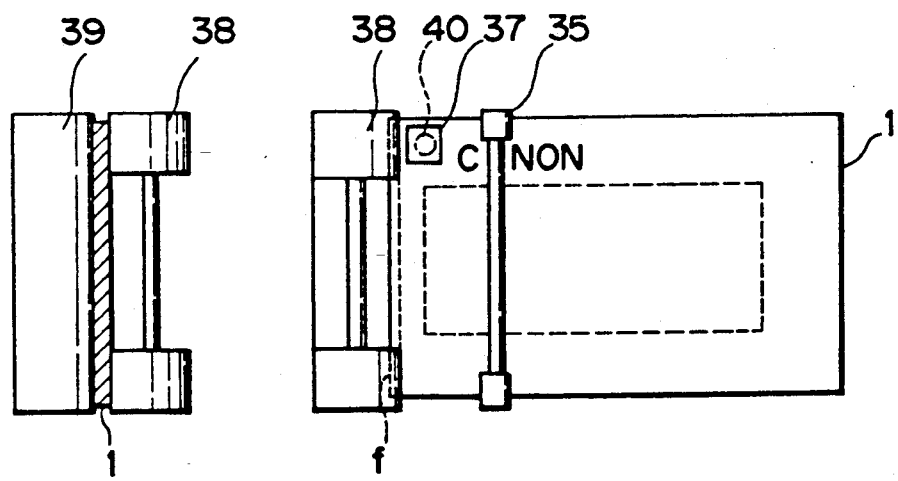

FIG. 13A is a schematic illustration of an optical card feeding device, and FIG. 13B shows the construction of the optical card feeding device.

FIG. 14 is an illustration for determining the home position of the optical card.

FIG. 15 illustrates the reference track detecting operation.

When the insertion of the optical card 1 into the drive 19 is detected by a sensor, not shown, the card feeding motor 14 is controlled so as to feed the optical card 1 into the L direction, and as shown in FIGS. 13A and 13B, the optical card 1 is fed in the L direction by a roller 35. The reference numerals 38 and 39 designate rollers for supporting the optical card. A light-emitting element 37 and a light-receiving element 36 are used to detect the passage of the leading end edge f of the optical card 1 past the light-receiving sensor 36 as shown in FIGS. 13A and 13B, the signal 36-1 of the light-receiving sensor 36 becomes HIGH at a point f, and when the detection aperture 40 of the optical card passes the light-receiving sensor, the signal becomes LOW at a point g, and after the detection aperture passes the light-receiving sensor, the signal again becomes HIGH at a point h. By the distance or time between f-g and between g-h being measured by a detector, not shown, whether the optical card 1 has been properly inserted is determined, and if the insertion is proper, the optical card 1 is conveyed by a predetermined distance and stopped. This stopped position is the home position 3.

If the insertion is not proper, the control circuit immediately reverses the rotation of the feed roller 35 to thereby discharge the card 1 and at the same time, urge the operator to re-insert the optical card 1, by means of a buzzer, a lamp or the like.

Subsequently, the operation of seeking the reference track (hereinafter referred to as the track 00) is executed. That operation is as follows: first, when the light spot is at the home position 3 by the operation, the MPU 10a drives the head feeding motor 13 so as to move a light pick-up 18 in the direction of arrow D in FIG. 4, and if as described in connection with FIG. 15, nothing is written between the tracking tracks, the output 22-1 of the detector 22 corresponding to the light spot S1 is time j, and if something is written between the tracking tracks, the output 22-1 is time k. Therefore, the control circuit measures the interval at which the light spot crosses the tracking tracks and seeks the G-mark 7, or examines the presence or absence of the G-mark at a predetermined position on each track while the optical card 1 is fed in the L and F directions, and seeks the G-mark 7. At the point of time whereat the G-mark has been detected, the head feeding motor 13 is stopped, and the optical card is once returned in the F direction, and then is moved in the L direction, and the G-mark is again detected, whereby it is confirmed that the current information track is the track 00.

After the G-mark 7 has been detected, the optical card 1 is intactly fed in the L direction (the light spot is in the F direction), and the MPU 10a reads the medium kind discriminating pattern 8 (shown in FIG. 5) recorded on the track 00. This medium kind discriminating pattern 8 is such that the kind of the information recording-reproducing apparatus to be applied is pre-registered in the ROM in the MPU 10a and the MPU 10a judges whether the inserted optical card is capable of recording and reproducing, and if applicable, the discrimination information of the optical card is transmitted to the CPU 9, and if not applicable, the information of "recording and reproduction being impossible" is transmitted to the CPU 9.

Also, when applicable, the MPU 10a informs the CPU 9 that the unit has become ready. In response thereto, the CPU 9 transmits a command for recording or reproduction to the MPU 10a. The reproducing operation will again be described with reference to FIG. 9. When the light spot is at the point a, the optical card 1 is conveyed in the L direction (that is, the light spot is in the F direction), and whether there has existed the E-mark or the V-mark before the light spot reaches the point c is confirmed and memorized. After the light spot reaches the point c, the data demodulation signal from the modemodulating circuit 12 is stored into the RAM in the MPU 10a and the stored data is subjected to the error correction by the interleave system, by means of the ECC circuit 10b, and error check-up is executed.

After all the data of one information track has been stored and error check up has been executed, whether there has been the E mark or the V-mark on the information track being currently reproduced is examined. If the E-mark is absent and error is present or if the V-mark is present and error is present, the direction of feeding of the card is reversed and reproduction (re-try) is executed again. If the E-mark is absent and an error is absent or if the V-mark is present and an error is absent, track change is effected to prepare for the next reproducing operation and the MPU 10a forwards the reproduced data to the CPU 9. When the E-mark is present or when the V-mark is absent, track change is effected irrespective of the presence or absence of error and the next track is reproduced.

Figure 20:
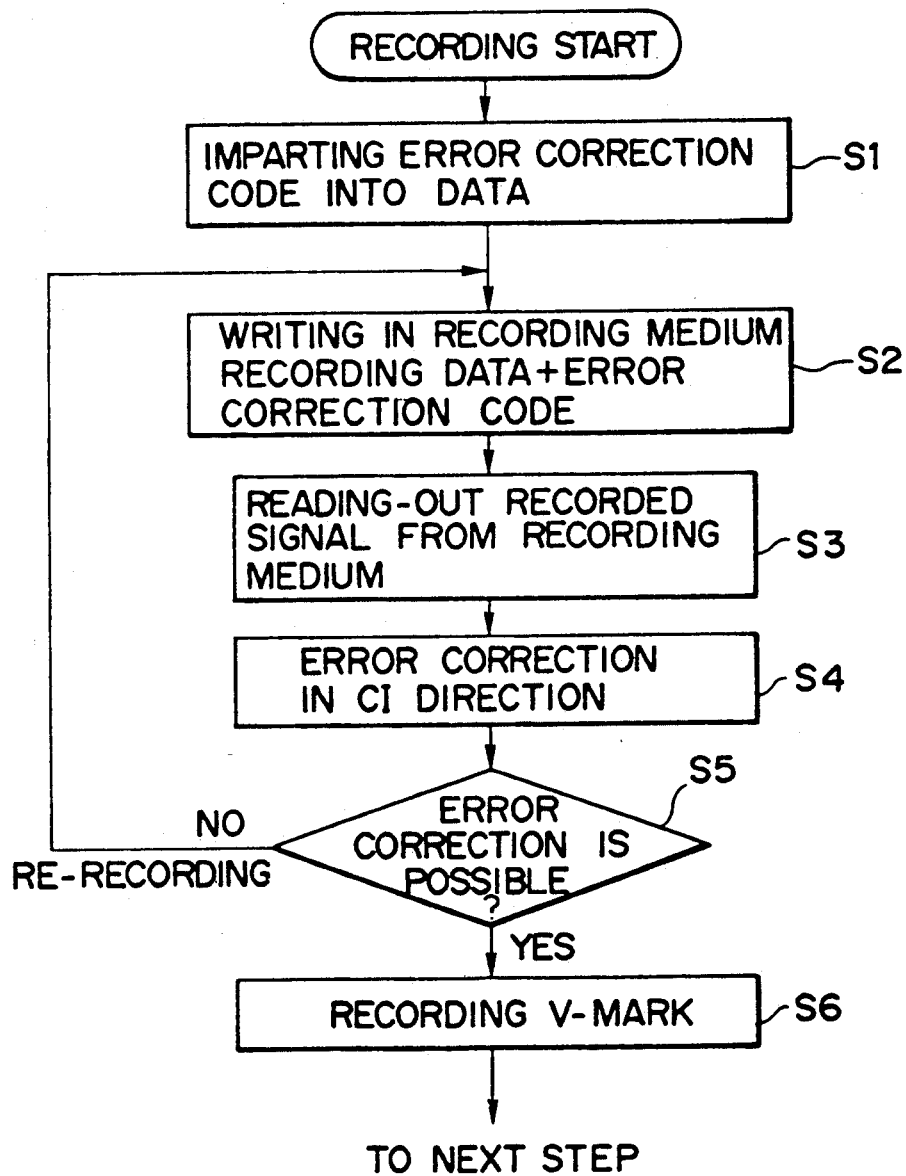
FIG. 20 is a flowchart illustrating the error check-up operation during recording.
Figure 21:
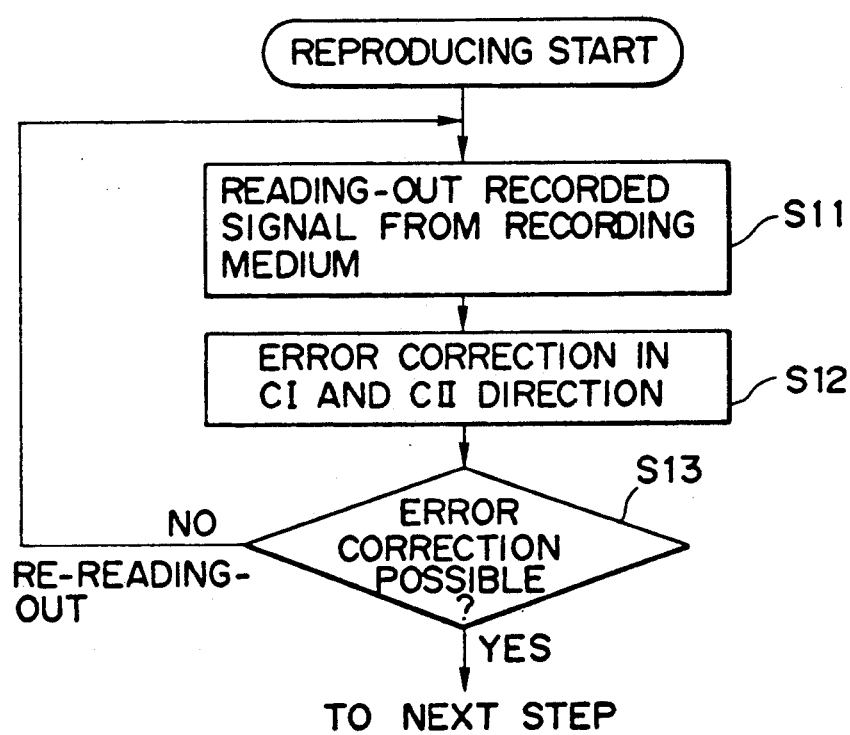
FIG. 21 is a flowchart illustrating the operation during reproduction.

The flow of the operation during recording and the flow of the operation during reproduction are shown in FIGS. 20 and 21, respectively, primarily regarding the ECC circuit 10b.

During recording, the MPU 10a recognizes the recording mode in accordance with the command from the CPU 9. As shown in FIG. 20, at step S1, the data input from the CPU 9 is first supplied to the ECC circuit 10a through the MPU 10a and an error correction data code is imparted. Subsequently, at step S2, the signal to which the error correction data code has been imparted is sent to the modemodulating circuit 12 to drive the irradiating optical system 17, whereby this signal is written into the optical card 1. Subsequently, at step S3, the outputs of the photodetectors 22-24 are supplied to the modemodulating circuit 12, whereby the written-in signal is read out. At step S4, this signal is sent to the ECC circuit 10b through the MPU 10a and error correction is effected. At this time, the ECC circuit 10b effects error correction only in the direction CI on the basis of the command for the recording mode from the MPU 10a. If error correction is possible at step S5, advance is made to step S6, whereby the V-mark is recorded as described in connection with FIG. 12, whereafter advance is made to the next step. If error correction is impossible at step S5, return is made to step S2, where re-recording is effected on the next track.

During reproduction, the MPU 10a recognizes the reproducing mode in accordance with the command from the CPU 9 shown in FIG. 3. As shown in FIG. 21, at step S11, the signal is first read out from the optical card 1. This reading-out is accomplished by the outputs of the photodetectors 22-24 being sent to the modemodulating circuit 12. Subsequently, at step S12, the read-out signal is sent to the ECC circuit 10b through the MPU 10a, and error correction is effected. At this time, the ECC circuit 10b effects error correction by the interleave system (the error correction in the directions CI and CII of FIG. 18) on the basis of the command for the reproducing mode from the MPU 10a. If at step S13, error correction is possible, this error-corrected reproduced data is output to the CPU 9 through the MPU 10a, and advance is made to the next step. If at step S13, a column or a row which cannot be error-corrected arises, return is made to step S11, where reading-out is re-tried. In FIG. 21, reading-out is repeated until error correction becomes possible, but if error correction cannot be accomplished even when it is re-tried several times, the MPU may be informed of the read error and the operation may be discontinued.

The present invention is not restricted to the above-described embodiment, but various modifications thereof are possible. For example, the present invention can also be applied to an apparatus using mediums other than the optical card, such as an optical disk or a magnetic disk. The present invention covers all such modifications without departing from the scope of the invention as defined in the appended claims.

What is claimed:

1. An information recording-reproducing method comprising the steps of:
   imparting an error correction code of M bytes and N bytes in a vertical direction and a horizontal direction, respectively, to data of m×n bytes, and producing a signal of (m+M)×(n+N) bytes (m, n, M and N being one or an integer greater than one);
   writing in the signal to which the error correction code has been imparted to a recording medium;
   reading out the written-in signal from the recording medium;
   effecting error correction on the read-out signal in only one of the vertical direction and the horizontal direction by the use of the error correction code included in the signal;
   determining whether abnormality exists in the writing-in when all the errors in the signal cannot be corrected by the error correction in the one direction;
   re-writing into the recording medium the signal for which it has been determined that abnormality has arisen during the writing-in;
   re-reading out from the recording medium the signal for which it has been determined that no abnormality exists in the writing-in; and
   effecting error correction on the re-read-out signal in the vertical direction and the horizontal direction by the use of the error correction code included in the signal and reproducing the data.

2. An information recording-reproducing method according to claim 1, wherein the data is recorded on one of a plurality of tracks formed on the recording medium, and further comprising the step of recording an error mark on a portion of the one track when determination is made in said determining step that error exists in the writing-in.

3. An information recording-reproducing method according to claim 1, wherein the data is recorded on one of a plurality of tracks formed on the recording medium, and further comprising the step of recording a verification mark on a portion of the one track when determination is made in said determining step that no abnormality exists in the writing-in.

4. An information recording-reproducing apparatus comprising:
   means for imparting an error correction code of M bytes and N bytes in a vertical direction and a horizontal direction, respectively, to data of m×n bytes, and producing a signal of (m+M)×(n+N) bytes (m, n, M and N being one of an integer greater than one);
   writing-in means for writing in the signal to which the error correction code has been imparted to a recording medium;
   means for reading out the written-in signal from the recording medium immediately after the writing-in and again thereafter;
   means for effecting error correction on the signal read out immediately after the writing-in in only one of the vertical direction and the horizontal direction and means for effecting error correction on the signal read out again thereafter in the vertical direction and horizontal direction by the use of the error correction code included in the signal;
   determining means for determining whether abnormality exists in the writing-in when all the errors in the signal cannot be corrected in the error correction of the signal read out immediately after the writing-in; and
   control means for causing said writing-in means to effect writing-in of the same signal as the signal when said determining means determines that abnormality exists in the writing-in.

* * * * *

UNITED STATES PATENT AND TRADEMARK OFFICE
CERTIFICATE OF CORRECTION

PATENT NO. : 5,128,946
DATED : July 7, 1992
INVENTOR(S) : Tsukasa Ogino, et al.

It is certified that error appears in the above-identified patent and that said Letters Patent is hereby corrected as shown below:

COLUMN 6

Line 2, "moveover," should read --moreover,--.

COLUMN 8

Line 13, "rows" should read --row--.

COLUMN 11

Line 49, "claimed:" should read --claimed is:--.

COLUMN 12

Line 38, "of" should read --or--.

Signed and Sealed this

Twenty-fourth Day of August, 1993

Attest:

BRUCE LEHMAN

Attesting Officer     Commissioner of Patents and Trademarks